United States Patent
Ye (10) Patent No.: US 11,118,696 B2
(45) Date of Patent: Sep. 14, 2021

(54) WATER FLOWING STRUCTURE

(71) Applicant: NINGBO DAYE GARDEN INDUSTRY CO., LTD, Zhejiang (CN)

(72) Inventor: Xiaodong Ye, Yuyao (CN)

(73) Assignee: NINGBO DAYE GARDEN INDUSTRY CO., LTD, Zhejiang (CN)

( * ) Notice: Subject to any disclaimer, the term of this patent is extended or adjusted under 35 U.S.C. 154(b) by 58 days.

(21) Appl. No.: 16/538,450

(22) Filed: Aug. 12, 2019

(65) Prior Publication Data
US 2020/0217427 A1 Jul. 9, 2020

(30) Foreign Application Priority Data
Jan. 5, 2019 (CN) .......................... 201920014820.4

(51) Int. Cl.
 *F16K 11/22* (2006.01)
 *F16K 27/00* (2006.01)
 *F16K 31/60* (2006.01)

(52) U.S. Cl.
 CPC ............ *F16K 11/22* (2013.01); *F16K 27/003* (2013.01); *F16K 31/602* (2013.01); *Y10T 137/87877* (2015.04)

(58) Field of Classification Search
 CPC ............. Y10T 137/87877; F16K 11/22; F16K 27/003; F16K 31/602
 See application file for complete search history.

(56) References Cited

U.S. PATENT DOCUMENTS

| | | | | |
|---|---|---|---|---|
| 2,751,930 A | * | 6/1956 | Redner | B01D 35/00 210/429 |
| 4,230,143 A | * | 10/1980 | Dettmann | A61C 1/0038 137/270 |
| 4,281,683 A | * | 8/1981 | Hetherington | F16K 11/22 137/240 |
| 4,306,582 A | * | 12/1981 | Marshall | F16K 11/22 137/100 |
| 4,432,392 A | * | 2/1984 | Paley | A61M 39/223 137/343 |
| 4,611,626 A | * | 9/1986 | Logsdon | F16K 11/22 137/594 |
| 4,848,391 A | * | 7/1989 | Miller | F24D 3/1075 137/270 |
| 5,950,661 A | * | 9/1999 | Kirchhoff-Stewens | F16K 11/22 137/269 |
| 6,058,975 A | * | 5/2000 | Hui-Chen | F16K 11/20 137/271 |

(Continued)

*Primary Examiner* — Seth W. Mackay-Smith
(74) *Attorney, Agent, or Firm* — Ladas & Parry, LLP (57) ABSTRACT

A water flowing structure is provide and comprises a double-way main body, a main water channel, a water inlet, main water outlets and the like, detachably mounted single-way connectors are respectively arranged at two ends of the double-way main body, a secondary water channel penetrating through along a shaft axis is formed in each single-way connector, each secondary water channel communicates with the main water channel, and each single-way connector is provided with a secondary water outlet communicated with the corresponding secondary water channel; a main adjusting switch is arranged between each single-way connector and the double-way main body; and a secondary adjusting switch is arranged in each single-way connector.

8 Claims, 5 Drawing Sheets

(56) References Cited

U.S. PATENT DOCUMENTS

| | | | | |
|---|---|---|---|---|
| 6,083,205 | A * | 7/2000 | Bourne | A61M 5/1408 |
| | | | | 137/883 |
| 6,206,028 | B1 * | 3/2001 | Holden | F16K 5/0647 |
| | | | | 137/271 |
| 6,568,713 | B1 * | 5/2003 | Bruvry | F16L 37/144 |
| | | | | 285/133.21 |
| 6,929,032 | B2 * | 8/2005 | Rehder | F16K 27/003 |
| | | | | 137/884 |
| 8,469,059 | B1 * | 6/2013 | Forst | F23R 3/36 |
| | | | | 137/883 |
| 8,584,708 | B2 * | 11/2013 | Bartnick | F16K 11/165 |
| | | | | 137/870 |
| 8,840,752 | B2 * | 9/2014 | Ogata | H01L 21/67028 |
| | | | | 156/345.29 |
| 9,038,665 | B2 * | 5/2015 | Cheng | F16K 11/24 |
| | | | | 137/883 |
| 9,371,947 | B2 * | 6/2016 | Choi | F16L 19/065 |
| 2003/0102039 | A1 * | 6/2003 | Marzorati | F16K 27/003 |
| | | | | 137/883 |
| 2004/0060594 | A1 * | 4/2004 | Montpetit | F16K 23/00 |
| | | | | 137/59 |
| 2008/0314466 | A1 * | 12/2008 | Cimberio | F16K 27/067 |
| | | | | 137/883 |
| 2016/0153571 | A1 * | 6/2016 | Braga | F16K 11/22 |
| | | | | 137/556 |
| 2019/0234520 | A1 * | 8/2019 | Painter | E21B 34/00 |

* cited by examiner

WATER FLOWING STRUCTURE

CROSS-REFERENCE TO RELATED APPLICATION

The present application claims priority to Chinese Application No. 201920014820.4 filed on Jan. 5, 2019, the disclosure of which is incorporated herein in its entirety by reference.

TECHNICAL FIELD

The present disclosure relates to a four-way water flowing structure, namely a novel four-way water flowing structure.

RELATED ART

At present, various four-way water flowing products are used for water distribution of irrigation for landscaping, the structure of a four-way water flowing product mainly consists of a double-way main body, a main water channel arranged in the double-way main body in a penetrating manner along a shaft axis as well as a water inlet and water outlets which are formed in the outside of the double-way main body and communicate with the main water channel, and the like; generally, only one water inlet is required, but a plurality of water outlets can be arranged according to requirements of water distribution, in an existing four-way water flowing structure, a plurality of water outlets are generally designed on the double-way main body integrally, thus, the structural design is ugly, a use function is single, the size is large, an adjusting switch for opening and closing each water outlet is only a simple valve structure, opening and closing adjustment is realized by a rotating mode mostly, and an operation state recognition degree is poor. Therefore, with continuous expanding of irrigation markets for landscaping, many consumers also urgently hope that manufacturers are able to produce more four-way water flowing structures with different structures and operation modes to meet market demands.

SUMMARY

The present disclosure aims to provide a novel four-way water flowing structure which is attractive in structural design, small in size, flexible to use and high in operation state recognition degree so as to overcome shortcomings in the prior art.

The technical problems of the present disclosure are solved through the following technical scheme:

a novel four-way water flowing structure includes a double-way main body, a main water channel arranged in the double-way main body in a penetrating manner along a shaft axis as well as a water inlet and main water outlets which are formed in the outside of the double-way main body and communicate with the main water channel, single-way connectors being detachably mounted are respectively arranged at two ends of the double-way main body, a secondary water channel penetrating through along a shaft axis is formed in each single-way connector, each secondary water channel communicates with the main water channel, and a secondary water outlet communicated with the corresponding secondary water channel is formed in the outside of each single-way connector; a main adjusting switch being hermetically and rotatably mounted in a plugged manner is arranged between each single-way connector and the double-way main body, and each main adjusting switch rotates and controls flow adjustment and sealing opening and closing of the corresponding main water outlet; and a secondary adjusting switch being hermetically and rotatably mounted in a plugged manner is arranged in each single-way connector, and each secondary adjusting switch rotates and controls flow adjustment and sealing opening and closing of the corresponding secondary water outlet.

Each main adjusting switch consists of a main rotating portion and a main connecting portion formed by extending into the double-way main body in an integrated manner along a shaft axis; and a main sealing plate opposite to the corresponding main water outlet is formed in the outer surface of each main connecting portion, and flow adjustment and sealing opening and closing of each main water outlet are realized by the corresponding main sealing plate under the effect of rotation of the corresponding main adjusting switch.

A main water flowing hole penetrating through along a shaft axis is formed in each main rotating portion and the corresponding main connecting portion, a main water cavity is formed between each main connecting portion and the double-way main body, and the main water channel communicates with each main water cavity via the corresponding main water flowing hole.

Each secondary adjusting switch consists of a secondary rotating portion and a secondary connecting portion formed by extending into the corresponding single-way connector in an integrated manner along a shaft axis; and a secondary sealing plate opposite to the corresponding secondary water outlet is formed in the outer surface of each secondary connecting portion, and flow adjustment and sealing opening and closing of each secondary water outlet are realized by the corresponding secondary sealing plate under the effect of rotation of the corresponding secondary adjusting switch.

A secondary water flowing hole of which the outer end is closed and the inner end penetrates through the corresponding secondary connecting portion along a shaft axis is formed in each secondary connecting portion, each secondary water flowing hole communicates with the corresponding main water flowing hole, a secondary water cavity is formed between each secondary connecting portion and the corresponding single-way connector, and each secondary water cavity communicates with the corresponding secondary water flowing hole.

Each main rotating portion is provided with a main shifting rod, two main sealing rings are arranged outside each main rotating portion, and are respectively in contact with the inside of the double-way main body and the inside of the corresponding single-way connector in a dynamic seal manner; a main barb is arranged at an end of each main connecting portion, a main inner shoulder forming a release stopping limitation with the corresponding main barb is arranged in the double-way main body correspondingly; and a plurality of main water flowing gaps are formed in the outer surface of each main connecting portion, and each main water flowing hole communicates with the corresponding main water cavity via the plurality of main water flowing gaps.

Each secondary rotating portion is provided with a secondary shifting rod, and two secondary sealing rings are arranged outside each secondary rotating portion, and are simultaneously in contact with the inside of the corresponding single-way connector in a dynamic seal manner; a secondary barb is arranged at an end of each secondary connecting portion, a secondary inner shoulder forming a release stopping limitation with the corresponding secondary barb is arranged in each single-way connector correspondingly; and a plurality of secondary water flowing gaps are formed in the outer surface of each secondary connecting portion, and each secondary water flowing hole communicates with the corresponding secondary water cavity via the plurality of secondary water flowing gaps.

An upper fixing cover and a lower fixing cover are arranged outside the double-way main body and the single-way connectors and are fastened to seal the double-way main body and the single-way connectors, semicircular notches are respectively formed between the upper fixing cover and the lower fixing cover, the upper fixing cover and the lower fixing cover are fastened on the necks of the water inlet, the main water outlets and the secondary water outlets via the semicircular notches, and thus, the water inlet, the main water outlets and the secondary water outlets are exposed; and a decorative waistline is arranged between the upper fixing cover and the lower fixing cover.

The upper fixing cover is provided with a decorative shell fixed on the outer surface of the upper fixing cover in a covering manner, the upper fixing cover is provided with main shifting holes for the main shifting rods to extend out and be exposed and secondary shifting holes for the secondary shifting rods to extent out and be exposed, the decorative shell is provided with travel grooves corresponding to the main shifting holes and the secondary shifting holes, each travel groove extends in the radial direction, and a main shifting block correspondingly fixed on the corresponding main shifting rod and a secondary shifting block correspondingly fixed on the corresponding secondary shifting rod are arranged in each travel groove.

A joint fastener, a joint seat, a filter cover and a double threaded joint which are successively mounted in a sealed manner from inside to outside are arranged in the water inlet.

Compared with the prior art, the present disclosure mainly has the characteristics that the single-way connectors being detachably mounted are respectively additionally arranged at two ends of the double-way main body, each secondary water channel penetrating through along the shaft axis is arranged in the corresponding single-way connector, each secondary water channel communicates with the main water channel, and each secondary water outlet communicated with the corresponding secondary water channel is formed in the outside of the corresponding single-way connector; therefore, by the single-way connectors which are arranged in series, the water outlets can be mounted separately and do not need to be arranged on the double-way main body in a centralized manner, the structural design is attractive, the size is small, and the structure is flexible to use; meanwhile, each main adjusting switch being hermetically and rotatably mounted in a plugged manner is arranged between the corresponding single-way connector and the double-way main body, and each main adjusting switch rotates and controls flow adjustment and sealing opening and closing of the corresponding main water outlet; and each secondary adjusting switch being hermetically and rotatably mounted in a plugged manner is arranged in the corresponding single-way connector, and each secondary adjusting switch rotates and controls flow adjustment and sealing opening and closing of the corresponding secondary water outlet. Moreover, water can flow through an inner hole through the main adjusting switches and the secondary adjusting switches, adjustment as well as opening and closing are carried out by a shifting and rotating mode, and the operation state recognition degree is also higher.

DETAILED DESCRIPTION

Hereinafter, embodiments of the present disclosure will be described in detail with reference to the above-mentioned drawings.

As shown in FIG. 1 to FIG. 4, 1 represents double-way main body, 11 represents main water channel, 12 represents water inlet, 13 represents main water outlet, 14 represents joint fastener, 15 represents joint seat, 16 represents filter cover, 17 represents double threaded joint, 18 represents main inner shoulder, 2 represents single-way connector, 21 represents secondary water channel, 22 represents secondary water outlet, 23 represents secondary inner shoulder, 3 represents main adjusting switch, 31 represents main sealing plate, 32 represents main water flowing hole, 33 represents main water cavity, 34 represents main shifting block, 35 represents main rotating portion, 36 represents main connecting portion, 37 represents main shifting rod, 38 represents main water flowing gap, 39 represents main barb, 4 represents secondary adjusting switch, 41 represents secondary sealing plate, 42 represents secondary water flowing hole, 43 represents secondary water cavity, 44 represents secondary shifting block, 45 represents secondary rotating portion, 46 represents secondary connecting portion, 47 represents secondary shifting rod, 48 represents secondary water flowing gap, 49 represents secondary barb, 5 represents upper fixing plate, 51 represents main shifting hole, 52 represents secondary shifting hole, 53 represents semicircular notch, 6 represents lower fixing plate, 7 represents decorative cover, 71 represents travel groove, 8 represents main sealing ring, 9 represents secondary sealing ring, and 10 represents decorative waistline.

A novel four-way water flowing structure is disclosed, a four-way water flowing structure for water distribution of irrigation for landscaping is mainly involved, and the novel four-way water flowing structure includes a double-way main body 1, a plurality of single-way connectors 2, main adjusting switches 3, secondary adjusting switches 4 and the like.

Figure 1:
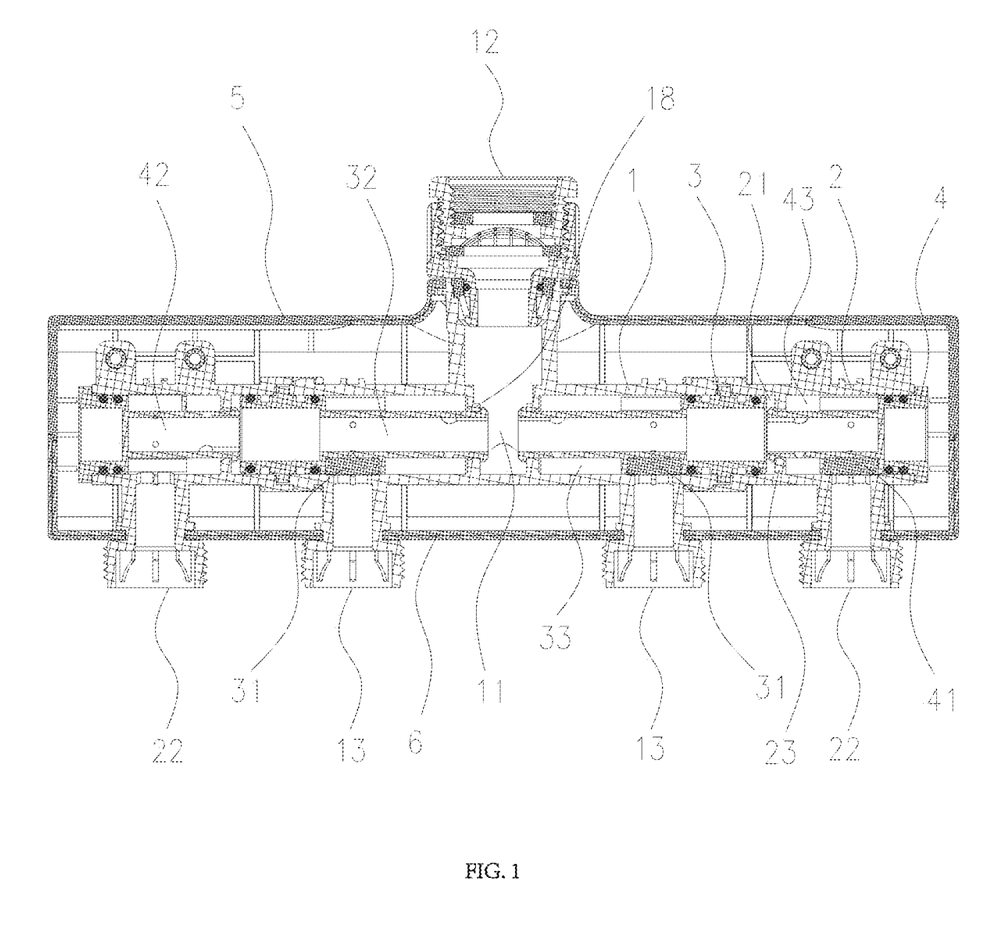
FIG. 1 is a schematic view of a sectional structure of the present disclosure.
Figure 2:
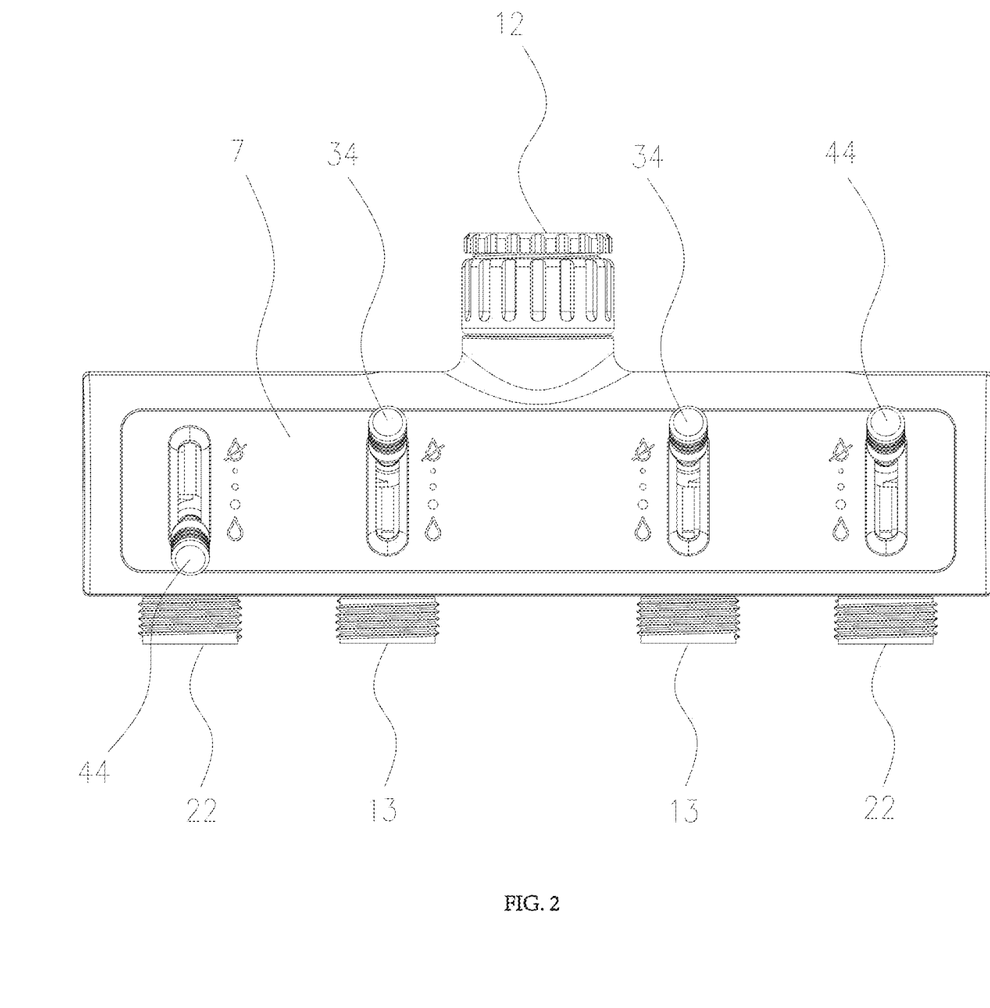
FIG. 2 is a schematic view of an external structure of FIG. 1.
Figure 3:
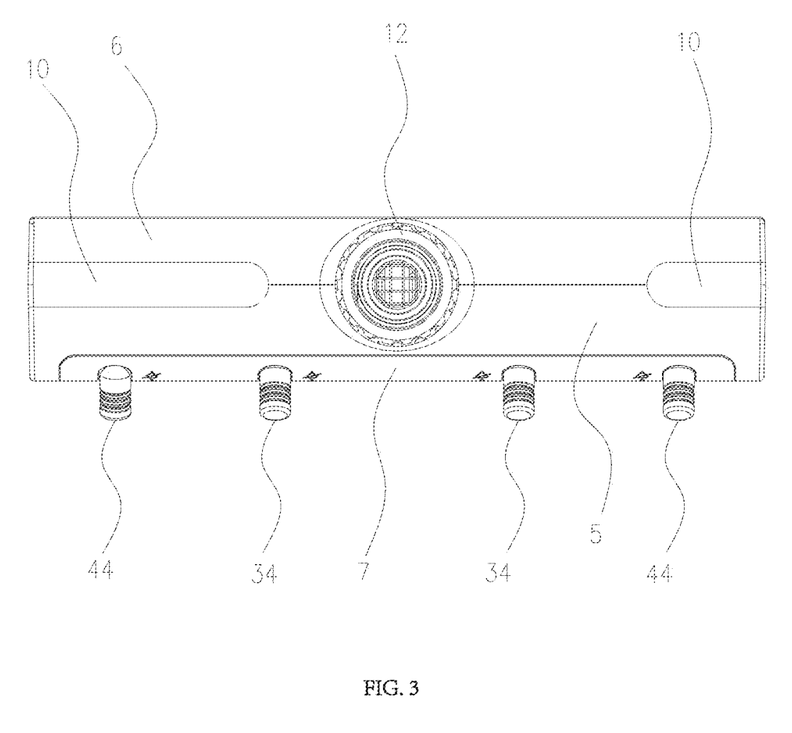
FIG. 3 is a bottom view of FIG. 2.
Figure 4:
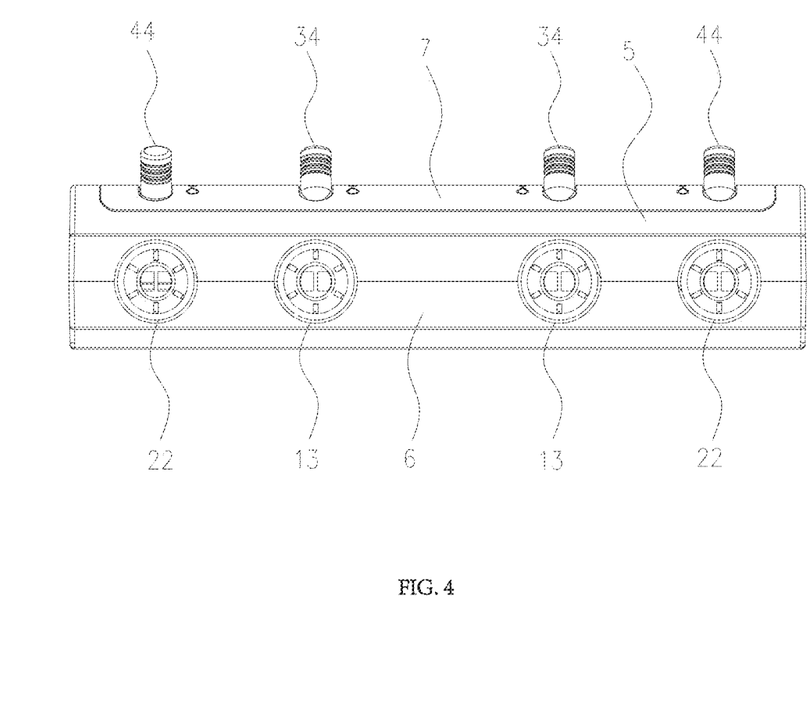
FIG. 4 is a top view of FIG. 2.
Figure 5:
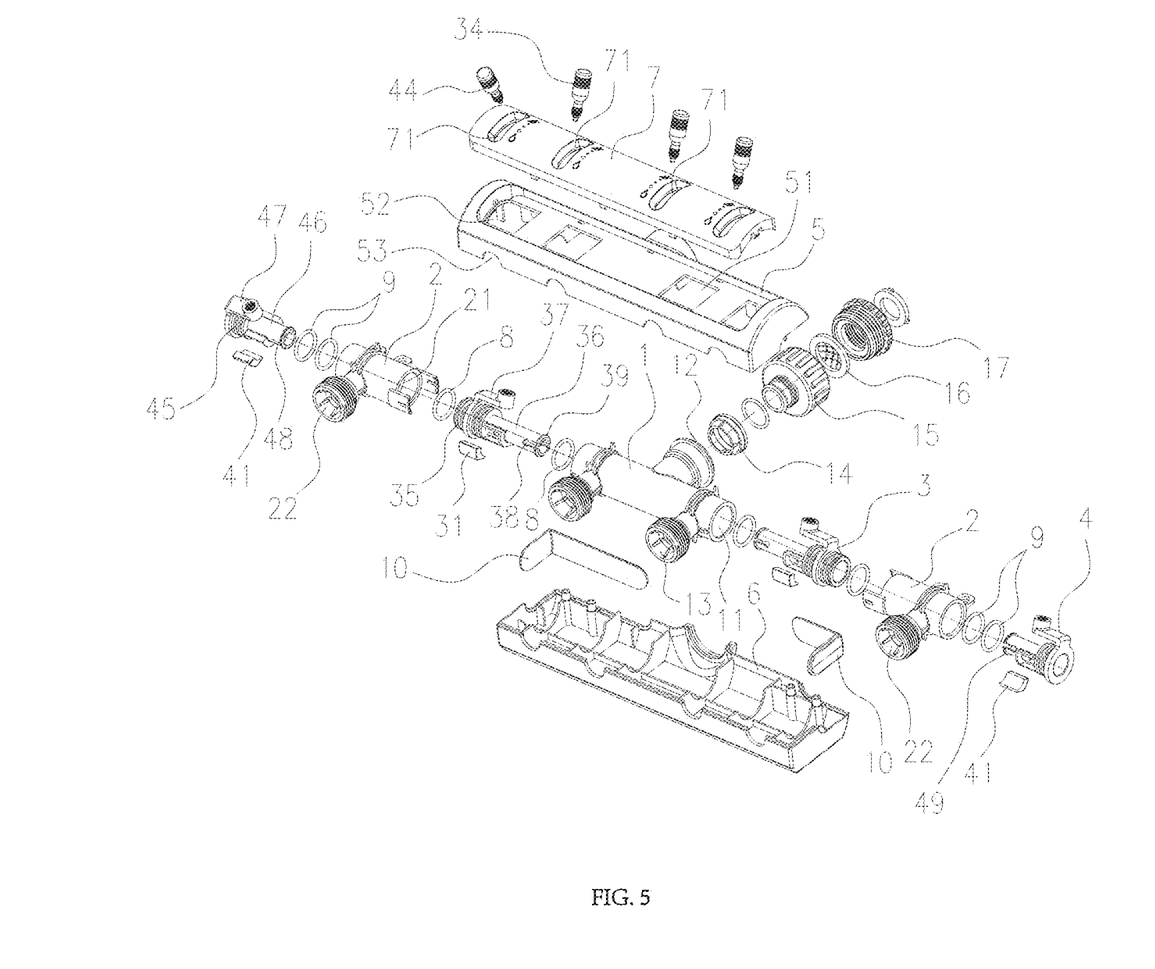
FIG. 5 is a three-dimensional exploded view of FIG. 2.

A main water channel 11 which is arranged in a penetrating manner along a shaft axis is formed in the double-way main body 1, a water inlet 12 and two main water outlets 13 are formed in the outside of the double-way main body 1; the water inlet 12 is formed in the middle of the upper portion of the double-way main body 1 as shown in FIG. 1, and communicates with the main water channel 11, and a joint fastener 14, a joint seat 15, a filter cover 16 and a double threaded joint 17 which are successively mounted in a sealed manner from inside to outside are arranged in the water inlet 12; and the two main water outlets 13 are simultaneously formed in the two sides of the lower portion of the double-way main body 1 as shown in FIG. 1, and are symmetrically arranged by taking the water inlet 12 as a center, and the two main water outlets 13 simultaneously communicate with the main water channel 11.

The single-way connectors 2 are respectively and detachably mounted at two ends of the double-way main body 1, namely, the single-way connectors 2 being detachably mounted are respectively arranged at two ends of the double-way main body 1 as shown in FIG. 1, that is, the double-way main body 1 is connected with the single-way connectors 2 in series, the design structures of the single-way connectors 2 are completely the same, and thus, the structure of only one of the single-way connectors 2 is taken as an example to be described in detail in the embodiment.

A secondary water channel 21 penetrating through along a shaft axis is formed in each single-way connector 2, and when the single-way connectors 2 and the double-way main body 1 are fastened and connected to form a whole body, the secondary water channels 21 communicate with the main water channel 11; and a secondary water outlet 22 communicated with the corresponding secondary water channel 21 is formed in the outside of each single-way connector 2, namely, each secondary water outlet 22 is formed in the lower portion of the corresponding single-way connector 2 as shown in FIG. 1.

Meanwhile, a main adjusting switch 3 being hermetically and rotatably mounted in a plugged manner is arranged between each single-way connector 2 and the double-way main body 1, and a specific structure is as follows: each main adjusting switch 3 consists of a main rotating portion 35 and a main connecting portion 36 formed by extending into the double-way main body 1 in an integrated manner along a shaft axis, and a main water flowing hole 32 penetrating through along a shaft axis is formed in each main rotating portion 35 and the corresponding main connecting portion 36, and communicates with the main water channel 11, namely, water can flow through an inner hole by the main adjusting switches 3.

Each main rotating portion 35 is provided with a main shifting rod 37, two main sealing rings 8 are arranged outside each main rotating portion 35, and are respectively in contact with the inside of the double-way main body 1 and the inside of the corresponding single-way connector 2 in a dynamic seal manner to seal the corresponding main adjusting switch 3 during shifting and rotating of the corresponding main adjusting switch 3; a main barb 39 is arranged at an end of each main connecting portion 36, a main inner shoulder 18 is arranged in the double-way main body 1 correspondingly, release stopping limitation is implemented by the main inner shoulder and the main barbs 39, and thus, the main adjusting switches 3 cannot drop from the inside of the double-way main body 1; and a main water cavity 33 is formed between each main connecting portion 36 and the double-way main body 1, a plurality of main water flowing gaps 38 are formed in the outer surface of each main connecting portion 36 and are generally adjacent to the corresponding main barb 39, the main water channel 11 communicates with the main water flowing holes 32, and each main water flowing hole can communicate with the corresponding main water cavity 33 via the plurality of main water flowing gaps 38.

A main sealing plate 31 opposite to the corresponding main water outlet 13 is further arranged on the outer surface of each main connecting portion 36, and flow adjustment and sealing opening and closing of each main water outlet 13 can be realized by the corresponding main sealing plate 31 under the effect of shifting and rotating of the corresponding main adjusting switch 3.

A secondary adjusting switch 4 being hermetically and rotatably mounted in a plugged manner is arranged in each single-way connector 2, a specific structure is as follows: each secondary adjusting switch 4 consists of a secondary rotating portion 45 and a secondary connecting portion 46 formed by extending into the corresponding single-way connector 2 in an integrated manner along a shaft axis, a secondary water flowing hole 42 of which the outer end is closed and the inner end penetrates through the corresponding secondary connecting portion 46 along a shaft axis is formed in each secondary connecting portion 46, and each secondary water flowing hole communicates with the corresponding main water flowing hole 32, namely, water can also flow through the inner hole by the secondary adjusting switches 4.

A secondary shifting rod 47 is arranged on each secondary rotating portion 45, two secondary sealing rings 9 are arranged outside each secondary rotating portion 45 and are simultaneously in contact with the inside of the corresponding single-way connector 2 in a dynamic seal manner to seal the corresponding secondary adjusting switch 4 during shifting and rotating of the secondary adjusting switch 4; a secondary barb 49 is arranged at an end of each secondary connecting portion 46, a secondary inner shoulder 23 is arranged in each single-way connector 2 correspondingly, release stopping limitation is implemented by each secondary inner shoulder and the corresponding secondary barb 49, and thus, each secondary adjusting switch 4 cannot drop from the inside of the corresponding single-way connector 2; and a secondary water cavity 43 is formed between each secondary connecting portion 46 and the corresponding single-way connector 2, a plurality of secondary water flowing gaps 48 are formed in the outer surface of each secondary connecting portion 46 and are generally adjacent to the corresponding secondary barb 49, each main water flowing hole 32 communicates with the corresponding secondary water flowing hole 42, and each secondary water flowing hole then can communicate with the corresponding secondary water cavity 43 via the plurality of secondary water flowing gaps 48.

A secondary sealing plate 41 opposite to the corresponding secondary water outlet 22 is arranged on the outer surface of each secondary connecting portion 46, and flow adjustment and sealing opening and closing of each secondary water outlet 22 can be realized by the corresponding secondary sealing plate under the effect of shifting and rotating of the corresponding secondary adjusting switch 4.

An upper fixing cover 5 and a lower fixing cover 6 are arranged outside the double-way main body 1 and the single-way connectors 2 and are fastened to seal the double-way main body 1 and the single-way connectors 2, semicircular notches 53 are respectively formed between the upper fixing cover 5 and the lower fixing cover 6, the upper fixing cover and the lower fixing cover are fastened to the necks of the water inlet 12, the main water outlets 13 and the secondary water outlets 22 via the semicircular notches 53, and the water inlet 12, the main water outlets 13 and the secondary water outlets 22 are exposed; and a decorative waistline 10 is arranged between the upper fixing cover 5 and the lower fixing cover 6.

The upper fixing cover 5 is provided with a decorative shell 7 fixed in a groove of the outer surface of the upper fixing cover in a covering manner, the upper fixing cover 5 is provided with main shifting holes 51 for the main shifting rods 37 to extent out and be exposed and secondary shifting holes 52 for the secondary shifting rods 47 to extent out and be exposed, travel grooves 71 corresponding to the main shifting holes 51 and the secondary shifting holes 52 are formed in the decorative shell 7, each travel groove 71 extends in the radial direction, a main shifting block 34 correspondingly fixed on the corresponding main shifting rod 37 and a secondary shifting block 44 correspondingly fixed on the corresponding secondary shifting rod 47 are arranged in each travel groove 71, and a flow mark and opening and closing marks are printed on one side of each travel groove 71 to increase operation state recognition degree and facilitate use.

Each main water outlet 13 or each secondary water outlet 22 of the present disclosure can be independently operated by the corresponding main adjusting switch 3 and the corresponding secondary adjusting switch 4, flow adjustment and sealing opening and closing of each water outlet can be controlled independently, and the structure is quite flexible to use.

The above description is only a specific embodiment of the present disclosure, and it should be understood by those skilled in the art that any structural design equivalent to the embodiment should be included within the scope of protection of the present disclosure.

What is claimed is:

1. A water flowing structure, comprising a main body, a main water channel formed in the main body with a water inlet and a plurality of main water outlets formed on the outside of the main body and communicating with the main water channel, wherein a detachably mounted connector is respectively arranged at two ends of the main body, a secondary water channel is formed in the connector, the secondary water channel is configured to communicate with the main water channel, and a secondary water outlet communicating with the secondary water channel is formed on the outside of the connector; a main adjusting switch being hermetically and rotatably mounted is arranged between the connector and the main body, and the main adjusting switch is configured to rotate and control flow adjustment and opening and closing of a main water outlet of the plurality of main water outlets; and a secondary adjusting switch being hermetically and rotatably mounted is arranged in the connector, and the secondary adjusting switch is configured to rotate and control flow adjustment and opening and closing of the secondary water outlet;

wherein the main adjusting switch comprises a main rotating portion and a main connecting portion formed by extending into the main body in an integrated manner; and a main sealing plate opposite to the main water outlet is arranged on the outer surface of the main connecting portion, and the main adjusting switch is configured to rotate and control flow adjustment and opening and closing of the main water outlet with the main sealing plate; and wherein a main water flowing hole is formed in the rotating portion and the main connecting portion, a main water cavity is formed between the main connecting portion and the main body, and the main water channel is configured to communicate with the main water cavity via the main water flowing hole.

2. The water flowing structure according to claim 1, wherein the secondary adjusting switch comprises a secondary rotating portion and a secondary connecting portion formed by extending into the connector in an integrated manner; and a secondary sealing plate opposite to the secondary water outlet is arranged on the outer surface of the secondary connecting portion, and the secondary adjusting switch is configured to rotate to control flow adjustment and opening and closing of the secondary water outlet with the secondary sealing plate.

3. The water flowing structure according to claim 2, wherein a secondary water flowing hole with the outer end closed and the inner end penetrating through the secondary connecting portion is formed in the secondary connecting portion, the secondary water flowing hole is configured to communicate with the main water flowing hole, a secondary water cavity is arranged between each the secondary connecting portion and the connector, and the secondary water cavity is configured to communicate with the secondary water flowing hole.

4. The water flowing structure according to claim 1, wherein the main rotating portion is provided with a main shifting rod, and a main sealing ring is arranged outside the main rotating portion, and is in contact with the inside of the main body and the inside of the connector in a dynamic seal manner; a main barb is arranged at an end of the main connecting portion, a main inner shoulder forming a release stopping limitation with the main barb arranged in the main body; and a plurality of main water flowing gaps are formed in the outer surface of the main connecting portion, and the main water flowing hole is configured to communicate with the main water cavity via the plurality of main water flowing gaps.

5. The water flowing structure according to claim 4, wherein a secondary shifting rod is arranged on the secondary rotating portion, and a secondary sealing ring is arranged outside of the secondary rotating portion, and is in contact with the inside of the connector in a dynamic seal manner; a secondary barb is arranged at an end of the secondary connecting portion, a secondary inner shoulder forming a release stopping limitation with the secondary barb is arranged in the connector; and a plurality of secondary water flowing gaps are formed in the outer surface of the secondary connecting portion, and the secondary water flowing hole is configured to communicate with the secondary water cavity via the plurality of secondary water flowing gaps.

6. The water flowing structure according to claim 5, wherein an upper fixing cover and a lower fixing cover are arranged outside the main body and the connector and are fastened to seal the main body and the connector, semicircular notches are respectively formed between the upper fixing cover and the lower fixing cover, the upper fixing cover and the lower fixing cover are fastened on necks of the water inlet, the main water outlet and the secondary water outlet via the semicircular notches.

7. The water flowing structure according to claim 6, wherein the upper fixing cover is provided with a main shifting hole for the main shifting rod to extend out and be exposed and a secondary shifting hole for the secondary shifting rod to extend out and be exposed, a shell is provided with a plurality of travel grooves corresponding to the main shifting hole and the secondary shifting hole, the travel groove extends in the radial direction, and a main shifting block fixed on the main shifting rod and a secondary shifting block fixed on the secondary shifting rod are arranged in the travel groove.

8. The water flowing structure according to claim 1, wherein a joint fastener, a joint seat, a filter cover and a double threaded joint being successively mounted in a sealed manner from inside to outside are arranged in the water inlet.

\* \* \* \* \*